(12) United States Patent
Gerbracht

(10) Patent No.: US 8,132,849 B2
(45) Date of Patent: Mar. 13, 2012

(54) AUXILIARY DOOR LATCH SYSTEM

(75) Inventor: John A. Gerbracht, Bagley, MN (US)

(73) Assignee: E-Z Door, LLC, Bagley, MN (US)

( * ) Notice: Subject to any disclaimer, the term of this patent is extended or adjusted under 35 U.S.C. 154(b) by 69 days.

(21) Appl. No.: 12/771,664

(22) Filed: Apr. 30, 2010

(65) Prior Publication Data

US 2011/0089715 A1  Apr. 21, 2011

Related U.S. Application Data

(60) Provisional application No. 61/279,362, filed on Oct. 19, 2009.

(51) Int. Cl.
B60P 3/325 (2006.01)
(52) U.S. Cl. .......................... 296/156; 49/503
(58) Field of Classification Search .................. 296/156; 292/336.3; 49/501, 503, 460; 160/89, 90, 160/91, 371, 380, 403
See application file for complete search history.

(56) References Cited

U.S. PATENT DOCUMENTS

| | | | |
|---|---|---|---|
| 3,391,674 A | 7/1968 | Burleigh | |
| 3,791,180 A | 2/1974 | Doyle | |
| 3,853,342 A | 12/1974 | Merrick | |
| 4,363,231 A * | 12/1982 | Kaveney, Jr. | 292/92 |
| 4,364,133 A | 12/1982 | Gunter | |
| 4,569,546 A | 2/1986 | Howard et al. | |
| 4,570,574 A | 2/1986 | Burkholder | |
| 4,612,728 A * | 9/1986 | Moriyoshi | 49/193 |
| 4,632,438 A | 12/1986 | McKinney | |
| 4,686,742 A | 8/1987 | Arnold | |
| 4,712,816 A | 12/1987 | Mueller | |
| 4,898,408 A | 2/1990 | Hauber | |
| 4,953,241 A | 9/1990 | Williams | |
| 5,072,978 A | 12/1991 | Woodward | |
| 5,172,944 A | 12/1992 | Munich et al. | |
| 5,180,201 A | 1/1993 | Hauber | |
| 5,193,863 A | 3/1993 | McBain | |
| 5,469,661 A | 11/1995 | Finkelstein et al. | |
| 5,622,416 A | 4/1997 | Rainey et al. | |
| 5,713,614 A | 2/1998 | Anderson | |
| 5,715,631 A | 2/1998 | Kailian et al. | |
| 5,906,423 A | 5/1999 | Lyu | |
| 6,067,690 A | 5/2000 | Herman | |
| 6,176,042 B1 | 1/2001 | Rossman et al. | |
| 6,360,488 B1 | 3/2002 | Darling | |
| 6,375,291 B1 | 4/2002 | Nam et al. | |
| 6,669,241 B1 | 12/2003 | Kelly | |
| 6,691,466 B2 | 2/2004 | Childress | |
| 6,789,601 B2 | 9/2004 | Rooth | |
| 7,370,890 B2 | 5/2008 | Samsel | |
| 2003/0015878 A1 * | 1/2003 | Fisher | 292/336.3 |

(Continued)

*Primary Examiner* — Lori Lyjak
(74) *Attorney, Agent, or Firm* — Hamre, Schumann, Mueller & Larson, P.C.

(57) ABSTRACT

A door latch apparatus is described that is installable on a door of, for example, a camper, to make it easier for kids, small adults, those in wheelchairs and the like, who may have difficulty reaching a conventionally located door handle, to open the door from the outside. Kids or short adult will no longer need to climb up steps to open the door or ask an adult for assistance, and make it easier to gain access without walking up and down camper steps. The door latch apparatus includes a second exterior door latch mounted lower on the door which is linked to a first or upper door latch. Either latch can be used to open the door.

15 Claims, 7 Drawing Sheets

U.S. PATENT DOCUMENTS

| | | |
|---|---|---|
| 2007/0113993 A1 | 5/2007 | Goren et al. |
| 2008/0000052 A1 | 1/2008 | Hong et al. |
| 2009/0033105 A1* | 2/2009 | Antonetti ............. 292/216 |
| 2009/0206615 A1* | 8/2009 | Kovie ............. 292/336.3 |

* cited by examiner

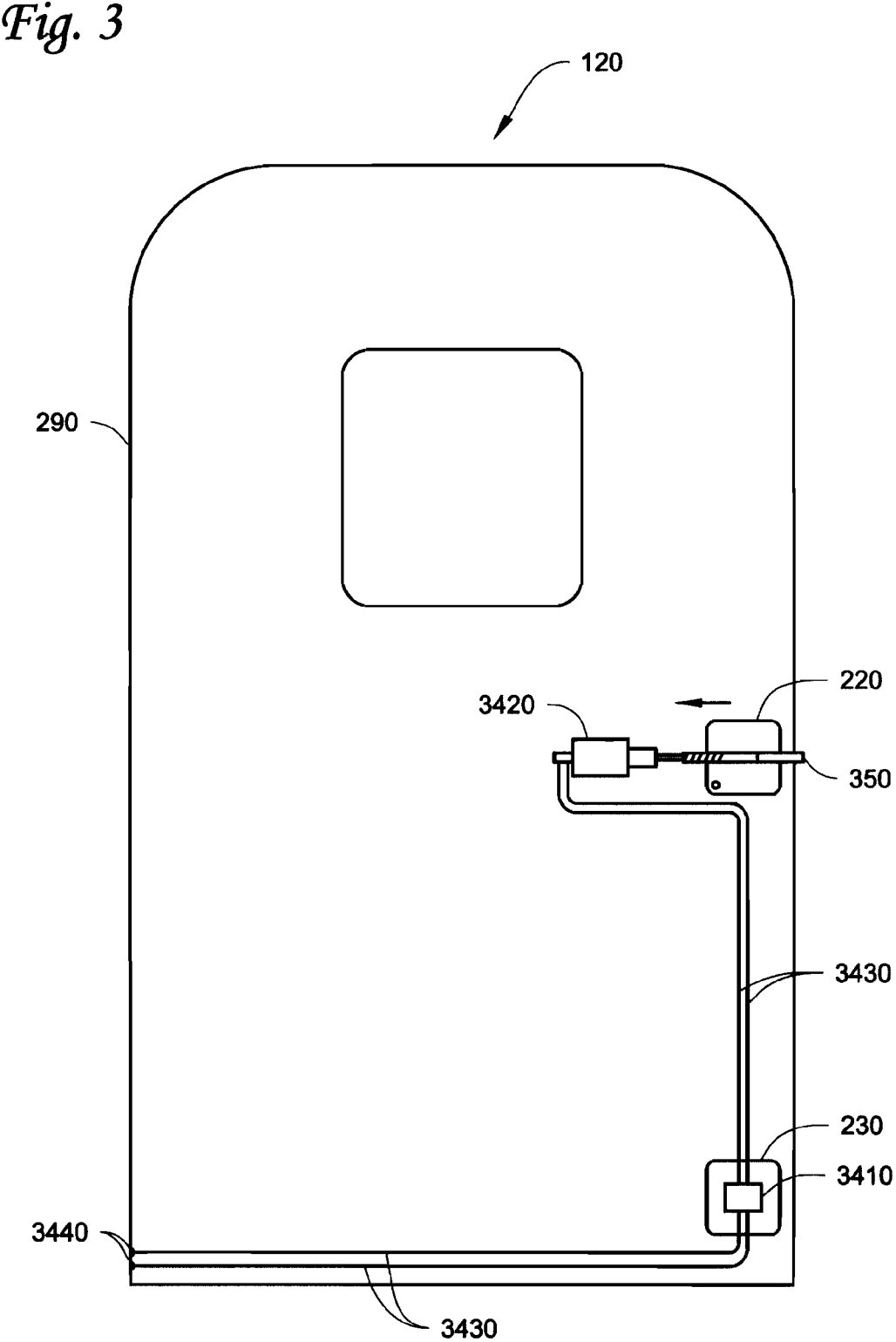

AUXILIARY DOOR LATCH SYSTEM

This application claims the benefit of provisional application Ser. No. 61/279,362 filed Oct. 19, 2009, which is incorporated by reference in its entirety.

FIELD

This disclosure relates to a door latch and a door with the door latch, more specifically, to a camper door with an auxiliary door latch system that makes it easier for children, small adults, those in wheelchairs and the like who may have difficulty reaching a conventionally located door handle to open from the outside.

BACKGROUND

With a conventional camper door, due to the height of the camper, the door latch is in such a position on the door that children, small adults, those in wheelchairs and the like may have difficulty reaching a conventionally located door handle in which case they may have to climb up steps in order to access the door latch in order to open the door. When steps are not available, children, small adults, those in wheelchairs and the like may not be able to access the door latch.

SUMMARY

A door latch apparatus is described that is installable on a door of, for example, a camper, to make it easier for children, small adults, those in wheelchairs and the like who may have difficulty reaching a conventionally located door handle, to open the door from the outside. The described door latch apparatus makes it easier for those who may have difficulty reaching a conventionally located door handle, to open the camper door from outside the camper. Children or small adults will no longer need to climb up steps to open the door or ask an adult for assistance, and make it easier to gain access without walking up and down camper steps. With an existing door latch, a child has to open the door, then climb back down the steps out of the way of the door, swing the door open and then go back up the steps.

In one disclosed example, a door latch apparatus installable on a door includes a door fastener and a first door handle installable into a first opening in the door and a second door handle installable into a second opening in the door. The first door handle is connectable to the door fastener to actuate the door fastener from a closed position to an open position. A linkage mechanism is connectable to the second door handle and to the door fastener or to the first door handle so the second door handle can actuate the door fastener from the closed position to the open position via the linkage mechanism.

In another disclosed example, a door includes a door panel, a door fastener mounted on the door panel, a first door handle mounted on the door panel at a first position and connected to the door fastener to actuate the door fastener from a closed position to an open position, a second door handle mounted on the door panel at a second position that is lower on the door panel than the first door handle, and a linkage mechanism connecting the second door handle to the door fastener or to the first door handle to actuate the door fastener from the closed position to the open position via the linkage mechanism.

In another disclosed example, a camper includes a camper body defining an interior space and a door mounted on the camper body. The camper body is mounted on wheels. The door includes a door panel having an interior side and an exterior side, a door fastener mounted on the door panel, a first door handle mounted on the exterior side of the door panel at a first position and connected to the door fastener to actuate the door fastener from a closed position to an open position, a second door handle mounted on the exterior side of the door panel at a second position that is lower on the door panel than the first door handle, and a linkage mechanism connecting the second door handle to the door fastener or to the first door handle to actuate the door fastener from the closed position to the open position via the linkage mechanism.

DRAWINGS

FIG. 3 illustrates a view of the interior of the door of FIG. 1, looking from inside the camper, showing one embodiment of a door latch apparatus that is electrically actuated.

DETAILED DESCRIPTION

A door latch apparatus is described that is installable on a door, such as a camper door, to make it easier for kids, small adults, those in wheelchairs and the like who may have difficulty reaching a conventionally located door handle, to open the door from the outside. The door latch apparatus will be described in association with a door of a camper. However, the door latch apparatus concepts described herein can be applied to any door having a conventional door latch apparatus that may be hard for people to reach in order to open the door.

Figure 1:
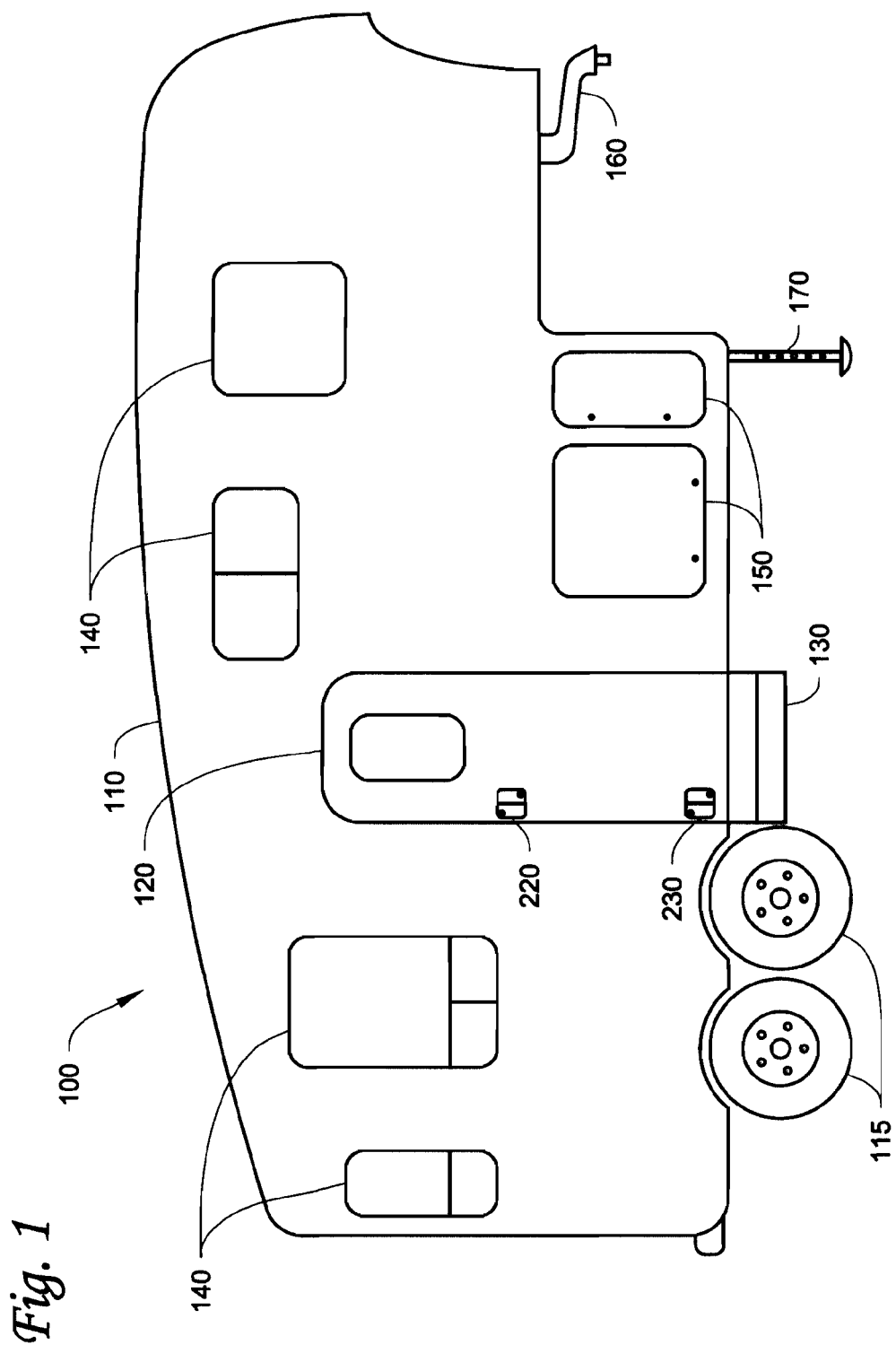
FIG. 1 illustrates a side view of a camper with a door that incorporates the inventive concepts and showing one embodiment of a door latch apparatus installed on the door.
Figure 6:
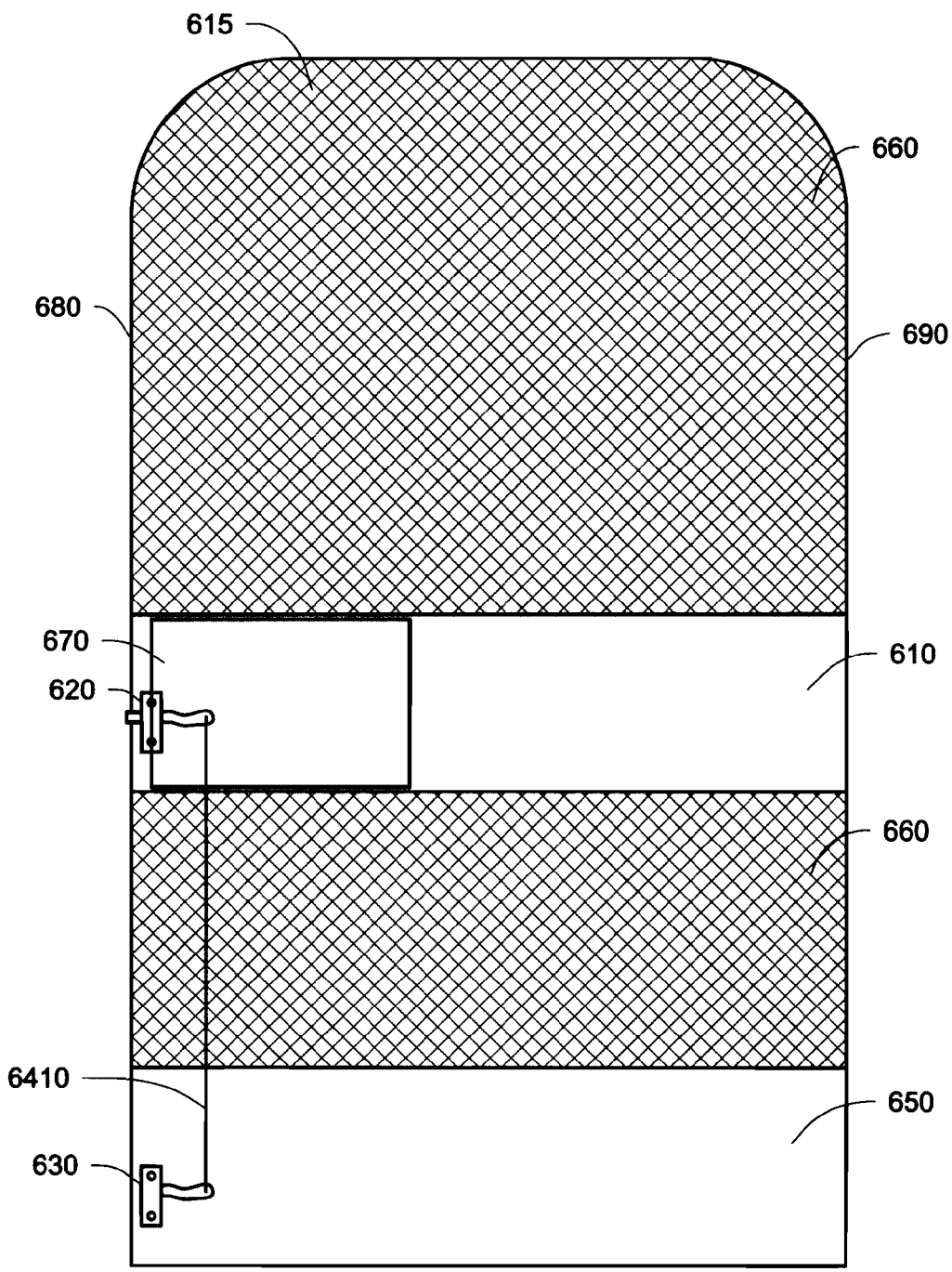
FIG. 6 illustrates an outside view of an embodiment of a camper screen door incorporating a door latch apparatus.

FIG. 1 illustrates one embodiment of a camper 100 that can employ the door latch apparatus concepts described herein. The camper 100 has a camper body 110 defining an interior space. The camper body is mounted on wheels 115 which allow the camper to roll along the ground during transport. A door 120 is mounted on the camper body 110 through which the interior space of the camper is accessed by users. Since the camper is typically elevated off the ground a certain distance, a plurality of steps 130 may optionally be provided on the camper to facilitate users entering and exiting the camper. Although FIG. 1 illustrates a single door, the camper can have a plurality of doors. In addition, the door 120 can be an outside or exterior door, and the camper can also have an inside or interior screen door (an example of which is illustrated in FIG. 6) that is adjacent to the interior side of the outside door 120.

The camper also has a plurality of windows 140 and storage compartments 150 but it is not necessary for the camper to have windows or storage compartments. A gooseneck 160 is connected to the front of the camper 100 by which the camper is connected to a vehicle for transporting the camper. The camper could alternatively be of the type that has its own engine allowing a user to drive the camper. A plurality of jack mechanisms 170 (only one is visible in FIG. 1) are also provided adjacent the front of the camper for use in supporting the front of the camper and leveling the camper.

As evident from FIG. 1, because of the wheels 115 and the jack mechanisms 170, the camper is elevated off of the ground a certain distance. This elevated position makes it hard for children and short adults to access a first door handle 220 on the door 120, especially if the steps 130 are not available.

FIG. 2 (*a*) illustrates the door 120 from the outside. The door 120 has a door panel 210. The door panel 210 includes an interior side shown in FIG. 2(*b*) and an exterior side shown in FIG. 2(*a*). The door panel 210 has a latch side 280 and a hinge side 290 via which the door is hingedly mounted to a door jamb. A door latch apparatus is installed on the latch side 280 of the door for controlling opening and closing of the door. The door 120 can also optionally include a window 240.

The door latch apparatus includes an interior door handle 250 (shown in FIG. 2*b*) that is connected to a door fastener that engages with the door jamb for retaining the door at a closed position, the first door handle 220 which is accessible from the exterior of the door and is connected to the door fastener to actuate the door fastener, a second exterior door handle 230 which can actuate the door fastener, and a linkage mechanism.

The interior door handle 250, the first door handle 220 and the door fastener are installed into a first opening in the door located at a conventional height on the door. The first, exterior door handle 220 is suitably connected to the door fastener to actuate the door fastener from a closed position, to retain the door at a closed position, to an open position which allows the door to be opened. The connection between a door handle and a door fastener to control the door fastener is well known in the art.

Figure 2A:
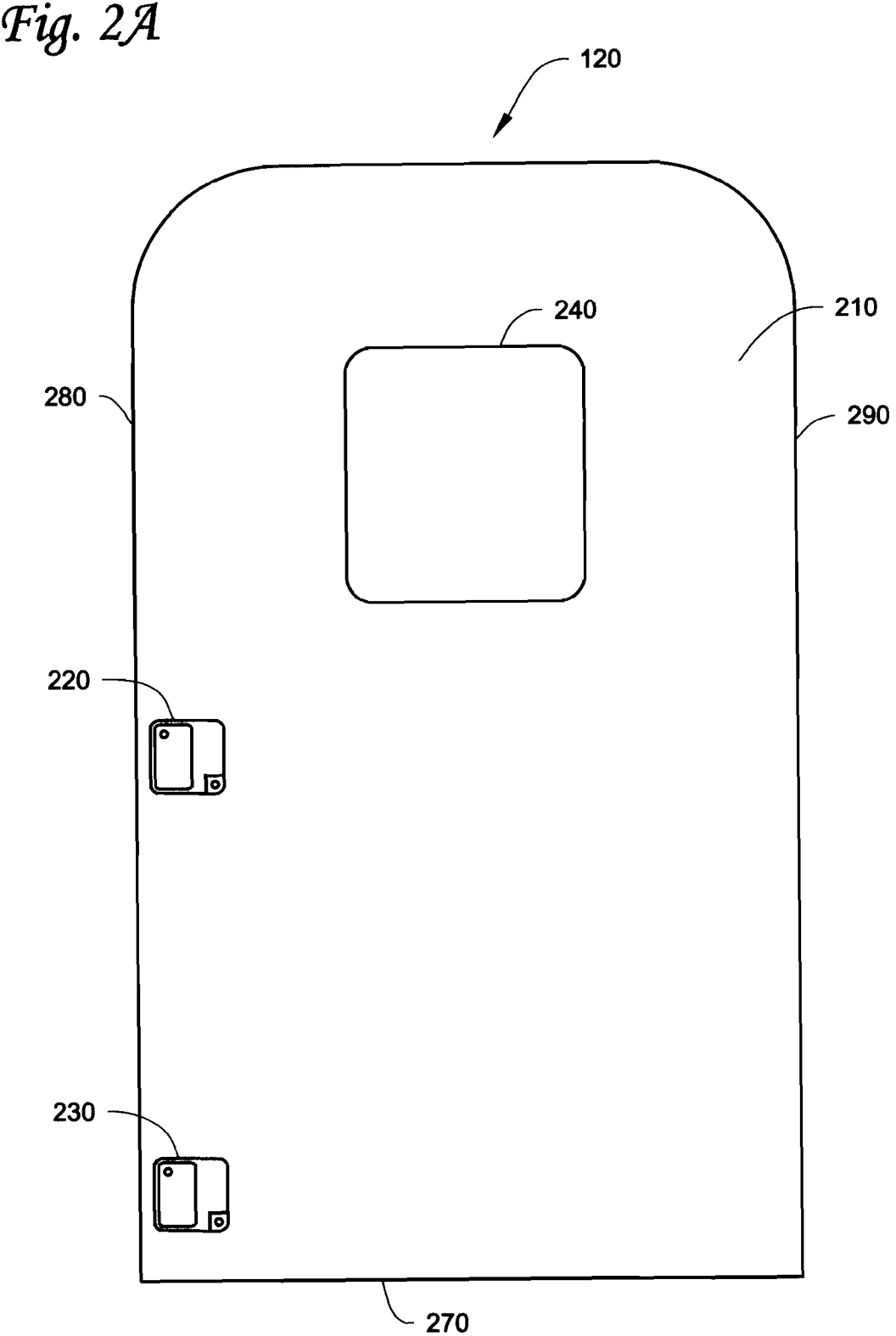
FIG. 2(a) illustrates an outside view of the door of FIG. 1.

The second exterior door handle 230 is installed into a second opening in the door so that the second door handle 230 is at a second position on the door. As shown in FIGS. 1 and 2*a*, the second position is lower on the door panel 210 than the position of the first door handle. For example, in the illustrated embodiment, the second position is adjacent a bottom edge 270 of the door panel. As shown in FIG. 2 (*a*), the first door handle 220 and the second door handle 230 are mounted on the exterior of the door, and the second latch mechanism is reachable by a short adult or a kid from the ground to open the door.

The second door handle 230 can mounted on the door panel 210 at any location one finds suitable for being accessible by kids or short adults. For example, the second door handle 230 can be approximately 7.0 inches from the bottom edge 270 of the door panel.

The linkage mechanism of the door latch apparatus is connected to the second door handle 230 and to the door fastener or to the first door handle 220 so that the second door handle 230 can actuate the door fastener from the closed position to the open position via the linkage mechanism. Any linkage mechanism that permits the second door handle 230 to actuate the door fastener can be used.

Figure 2B:
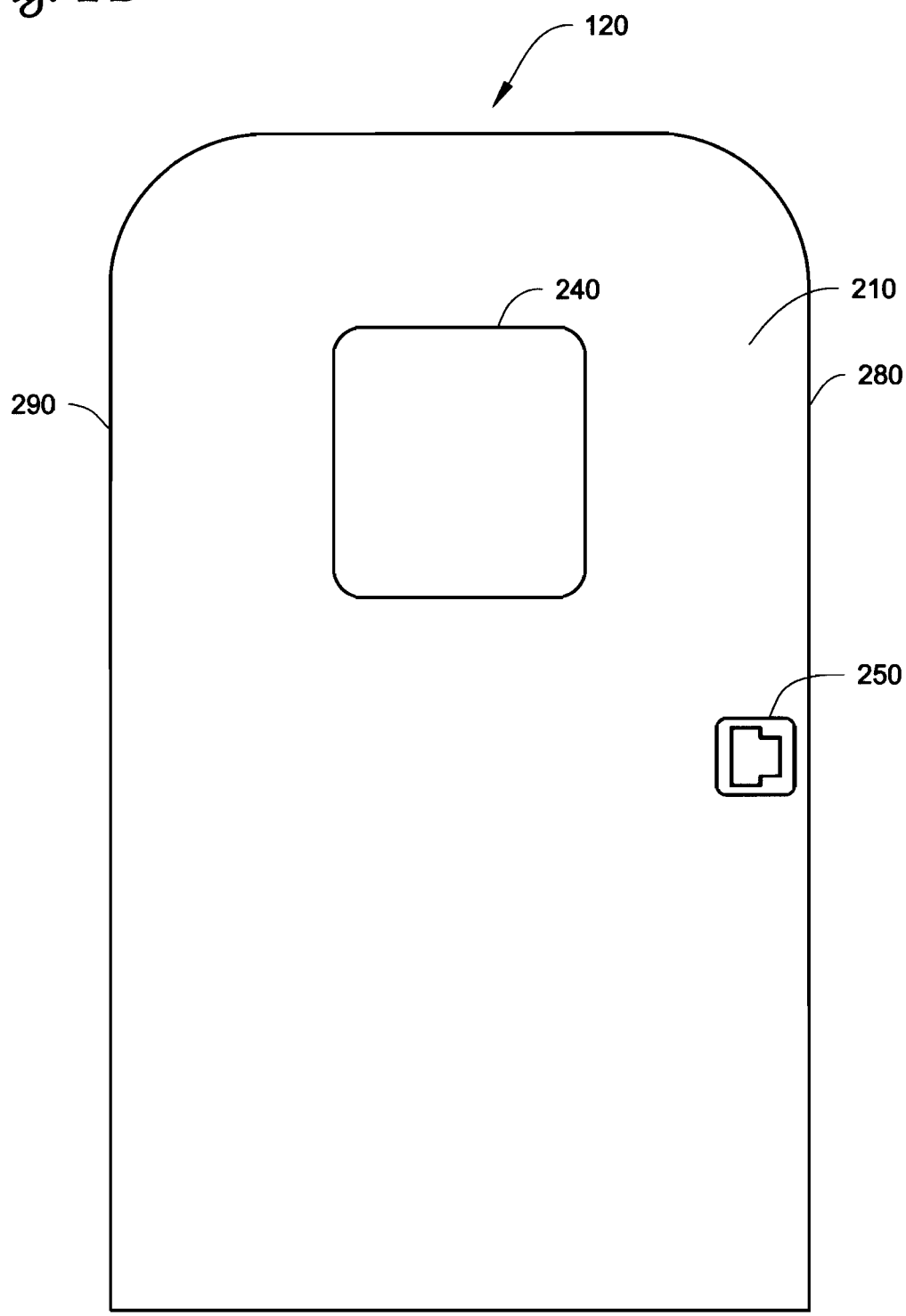
FIG. 2(b) illustrates an inside view of the door of FIG. 2(a).

As shown in FIG. 2*b*, the interior side of the door 120 appears similar to conventional doors, with the interior door handle 250 being actuated to actuate the door fastener and open the door. In the illustrated embodiment there is no corresponding interior door handle for the second exterior door handle 230.

FIG. 3 illustrates the interior of the door 120 that employs an electrically actuated linkage mechanism. The door latch apparatus includes a door fastener 350, which is illustrated as a bolt-like structure, that engages with a suitable recess on the door jamb for retaining the door in a closed position. The first exterior door handle 220 is suitably connected to the door fastener 350 to actuate the door fastener in the direction of the arrow from a locking position to an unlocked position. The door fastener 350 is preferably returned to the locking position by a spring. Any type of door fastener that can be actuated by the door handle 220 can be used.

The second exterior door handle 230 is connected to the door fastener 350 via the linkage mechanism for actuating the door fastener. In the embodiment of FIG. 3, the linkage mechanism is an electrically actuated mechanism that includes a switch 3410 that is connected to the second door handle 230, an actuator 3420, for example a solenoid, that is connected to the door fastener 350, and a plurality of wires 3430. The linkage mechanism is connected to a 12-Volt battery power supply of the camper via a plurality of electrical door contacts 3440 mounted on the hinge side 290 of the door and a plurality of spring loaded contacts 420 (shown in FIG. 4*b*) mounted in the door jamb 440. The door contacts 3440 are engaged with the contacts 420 when the door is closed to provide electrical power to the door. Although a 12-Volt battery of the camper is described as the power supply, any other type of power supply can be used. The wires 3430 electrically connect the door contacts to the switch 3410. The wires 3430 also electrically connect the switch 3410 to the actuator 3420.

When the door is closed, the switch 3410 is activated by the second door handle 230 when the second door handle is actuated. This closes the switch, which directs power to the actuator 3420 which in turn pulls the door fastener 350 in the direction of the arrow from the closed position to the open position. The door can then be pulled open via the second door handle 230. To facilitate door opening, the second door handle 230 is preferably a handle-type or other structure that allows a user to grip the second door handle to apply a pulling force on the door. When the door is opened, the door contacts 3440 are disengaged from the contacts 420, disconnecting the supply of power. The spring mechanism on the door fastener 350 then returns the door fastener to the closed position.

Figure 4A:
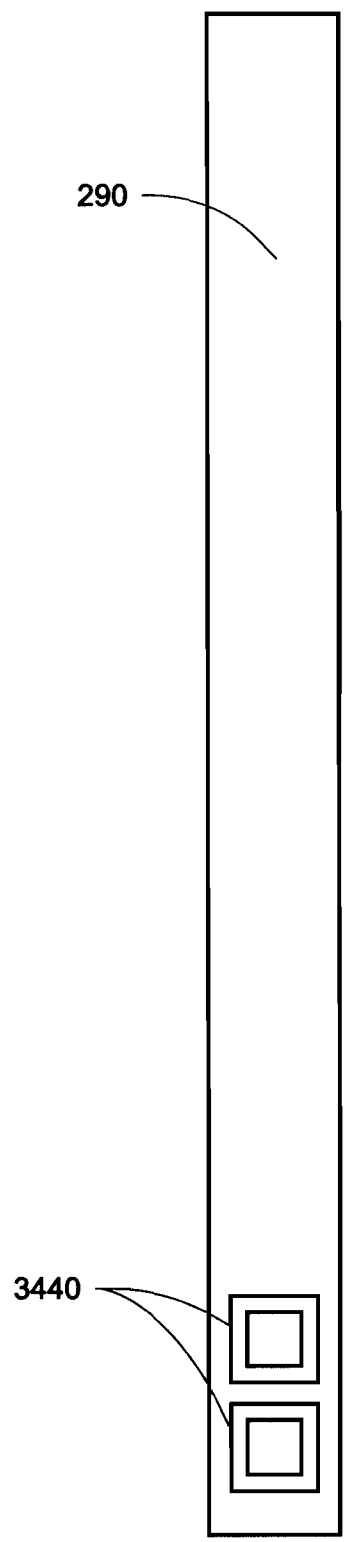
FIG. 4(a) illustrates an end view of the door of FIG. 3.
Figure 4B:
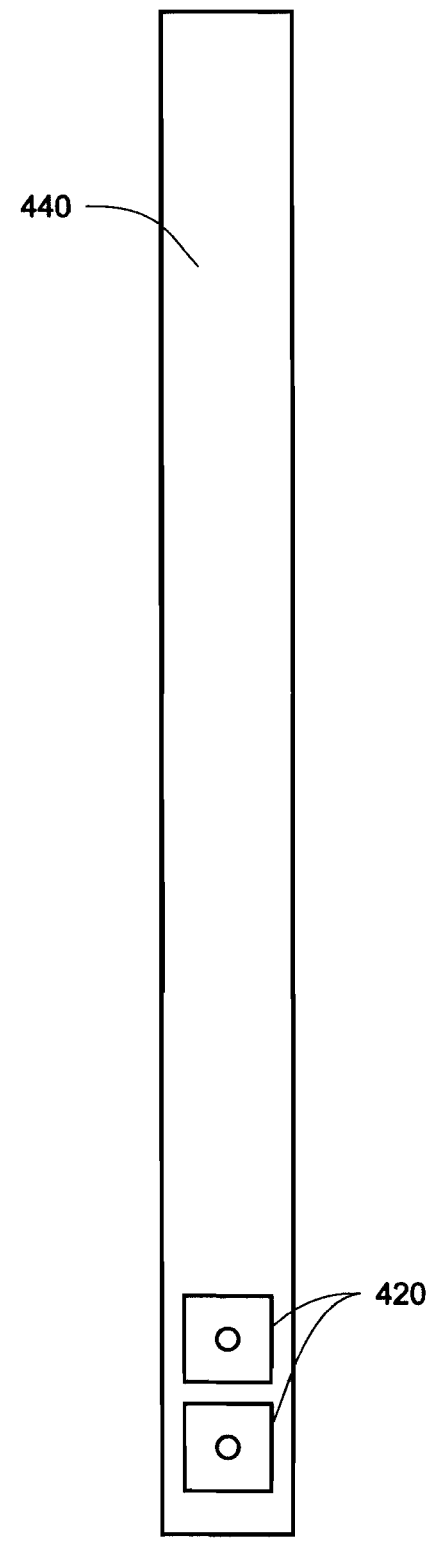
FIG. 4(b) illustrates an end view of a door jamb in which the door of FIG. 3 is mounted.

FIG. 4(*a*) illustrates the electrical door contacts 3440 of FIG. 3. The door contacts 3440 include, for example, two brass contacts on the hinge side 290 of the door panel. However, the door contacts 3440 can be any other types of electrical contacts. FIG. 4(*b*) illustrates the spring loaded contacts 420 disposed on the door jamb 440. The spring loaded contacts 420 are connected to the 12-Volt battery power supply of the camper.

Figure 5:
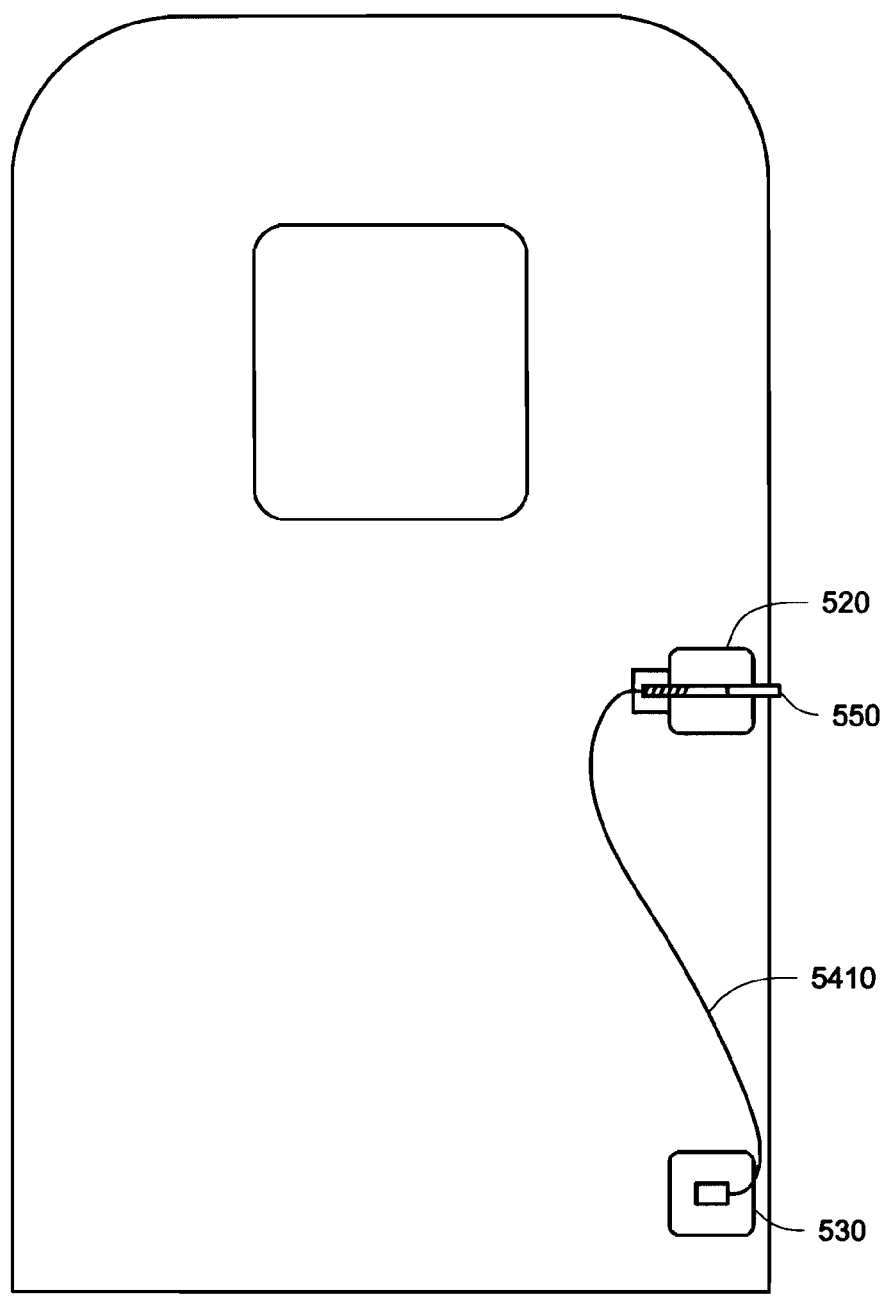
FIG. 5 illustrates an inside view of a door showing another embodiment of a door latch apparatus that is mechanically actuated.

FIG. 5 illustrates another embodiment of a door latch apparatus that utilizes a mechanical linkage mechanism. The door latch apparatus is similar to the door latch apparatus of FIGS. 1-3 in that it includes a door fastener 550, a first exterior door handle 520, a second exterior door handle 530 and a linkage mechanism. The door fastener 550 and the first door handle 520 are installed into a first opening in the door. The first door handle 520 is connected to the door fastener 550 to actuate the door fastener from a closed position to an open position. The second door handle 530 is installed into a second opening in the door and is connected to the fastener 550 via a mechanical linkage mechanism so that the second door handle 530 can actuate the door fastener 550 from the closed position to the open position.

The linkage mechanism includes a cable 5410 connecting the second door handle 530 and the door fastener 550. The cable 5410 has one end connected to the second door handle 530 and the other end connected to the fastener 550. When the second door handle is actuated, the cable 5410 transfers the force to the door fastener 550, thereby actuating the door fastener from the closed position to the open position. The cable 5410 can be, for example, a plastic coated steel cable. However, the cable 5410 can be made from other types of materials. The use of a mechanical linkage mechanism eliminates the need for the electrical contacts and wires used in the embodiment of FIG. 3.

FIG. 6 illustrates an outside view of a camper screen door incorporating a door latch apparatus. The screen door can be used adjacent to, but inside of the door 120 of FIG. 1. The door latch apparatus concepts used on the camper screen door, as discussed below, can be used on the door 120.

The door includes a door panel 610 having an interior side, an exterior side 615, a latch side 680, and a hinge side 690. The panel 610 also optionally includes a kick plate 650, a plurality of screens 660 permitting air flow through the door, and a sliding cover 670.

A door latch apparatus is installed on the latch side of the door panel 610. The door latch apparatus includes a door fastener that is actuatable from a closed position to an open position, a first exterior door handle 620 that is connected to the door fastener for actuating the door fastener, a second exterior door handle 630 and a linkage mechanism. The second door handle 630 is installed adjacent the bottom edge of the door below the first door handle.

The linkage mechanism is a mechanically actuated mechanism that includes a cable 6410 connected to the first door handle 620 and to the second door handle 630. When the second door handle 630 is actuated from the outside, the cable transfer the opening force to the first door handle, which actuates the first door handle 620, and which in turn actuates the door fastener from the closed position to the open position. The user can then open the door by pulling the second door handle outward.

FIGS. 3 and 5 illustrate the linkage mechanism connecting the second door handle to the door fastener so that the second door handle can be characterized as being directly connected to the door fastener. FIG. 6 illustrates the linkage mechanism connecting the second door handle to the first door handle, and since the first door handle is connected to the door fastener, the second door handle can also be characterized as being connected to, albeit indirectly, the door fastener. It is to be realized that the linkage mechanisms of FIGS. 3 and 5 could be connected to the first door handles to indirectly actuate the door fastener, and the linkage mechanism of FIG. 6 could be directly connected to the door fastener.

In addition, the door latch apparatus components can be sold as a kit that is installable on an existing door. The kit can include the door fastener, the first exterior door handle, the second exterior door handle, and the linkage mechanism. The interior door handle can also be included in the kit. It is also contemplated that one could utilize the preexisting door fastener, first exterior door handle and the interior door handle, in which case the kit would include the second exterior door handle and the linkage mechanism which are installed on the door and where the linkage mechanism connects the second exterior door handle to the door fastener or to the first exterior door handle.

Instead of the second exterior door handle being a handle, the second exterior door handle could be a button that is pushed which results in the door opening.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A door latch apparatus installable on a door, comprising:
 a door fastener and a first door handle installable into a first opening in the door, the first door handle is connectable to the door fastener to actuate the door fastener from a closed position to an open position;
 a second door handle installable into a second opening in the door; and
 a linkage mechanism connectable to the second door handle and to the door fastener or to the first door handle so the second door handle can actuate the door fastener from the closed position to the open position via the linkage mechanism, the linkage mechanism comprises an electrically actuated mechanism that includes a switch connected to the second door handle, an actuator connected to the door fastener, and a plurality of wires connecting the switch and the actuator.

2. A camper door, comprising:
 a door panel;
 a door fastener mounted on the door panel;
 a first door handle mounted on the door panel at a first position and connected to the door fastener to actuate the door fastener from a closed position to an open position;
 a second door handle mounted on the door panel at a second position that is lower on the door panel than the first door handle;
 a linkage mechanism connecting the second door handle to the door fastener or to the first door handle to actuate the door fastener from the closed position to the open position via the linkage mechanism;
 wherein the door panel has a first opening at the first position in which the first door handle and the door fastener are mounted, and a second opening at the second position in which the second door handle is mounted.

3. A door, comprising:
 a door panel;
 a door fastener mounted on the door panel;
 a first door handle mounted on the door panel at a first position and connected to the door fastener to actuate the door fastener from a closed position to an open position;
 a second door handle mounted on the door panel at a second position that is lower on the door panel than the first door handle;
 a linkage mechanism connecting the second door handle to the door fastener or to the first door handle to actuate the door fastener from the closed position to the open position via the linkage mechanism,
 wherein the second position is adjacent a bottom edge of the door panel.

4. A door, comprising:
 a door panel;
 a door fastener mounted on the door panel;
 a first door handle mounted on the door panel at a first position and connected to the door fastener to actuate the door fastener from a closed position to an open position;
 a second door handle mounted on the door panel at a second position that is lower on the door panel than the first door handle;
 a linkage mechanism connecting the second door handle to the door fastener or to the first door handle to actuate the door fastener from the closed position to the open position via the linkage mechanism;
 wherein the door panel includes an interior side and an exterior side, and the first and second door handles are mounted on the exterior side.

5. A door, comprising:
a door panel;
a door fastener mounted on the door panel;
a first door handle mounted on the door panel at a first position and connected to the door fastener to actuate the door fastener from a closed position to an open position;
a second door handle mounted on the door panel at a second position that is lower on the door panel than the first door handle;
a linkage mechanism connecting the second door handle to the door fastener or to the first door handle to actuate the door fastener from the closed position to the open position via the linkage mechanism;
wherein the door is configured to mount to a camper, and the door is an exterior door of the camper or an interior door of the camper.

6. The camper door of claim 2, wherein the linkage mechanism comprises an electrically actuated mechanism or a mechanically actuated mechanism.

7. A door, comprising:
a door panel;
a door fastener mounted on the door panel;
a first door handle mounted on the door panel at a first position and connected to the door fastener to actuate the door fastener from a closed position to an open position;
a second door handle mounted on the door panel at a second position that is lower on the door panel than the first door handle;
a linkage mechanism connecting the second door handle to the door fastener or to the first door handle to actuate the door fastener from the closed position to the open position via the linkage mechanism;
wherein the linkage mechanism comprises an electrically actuated mechanism that includes a switch connected to the second door handle, an actuator connected to the door fastener, and a plurality of wires connecting the switch and the actuator.

8. The camper door of claim 2, wherein the linkage mechanism comprises a mechanically actuated mechanism that includes a cable connecting the second door handle and the door fastener or the first door handle.

9. A camper, comprising:
a camper body defining an interior space, the camper body is mounted on wheels;
a door mounted on the camper body, the door including:
a door panel having an interior side and an exterior side;
a door fastener mounted on the door panel;
a first door handle mounted on the exterior side of the door panel at a first position and connected to the door fastener to actuate the door fastener from a closed position to an open position;
a second door handle mounted on the exterior side of the door panel at a second position that is lower on the door panel than the first door handle;
a linkage mechanism connecting the second door handle to the door fastener or to the first door handle to actuate the door fastener from the closed position to the open position via the linkage mechanism.

10. The camper of claim 9, wherein the door panel has a first opening at the first position in which the first door handle and the door fastener are mounted, and a second opening at the second position in which the second door handle is mounted.

11. The camper of claim 9, wherein the second position is adjacent a bottom edge of the door panel.

12. The camper of claim 9, wherein the door is an exterior door of the camper or an interior door of the camper.

13. The camper of claim 9, wherein the linkage mechanism comprises an electrically actuated mechanism or a mechanically actuated mechanism.

14. The camper of claim 9, wherein the linkage mechanism comprises an electrically actuated mechanism that includes a switch connected to the second door handle, an actuator connected to the door fastener, and a plurality of wires connecting the switch and the actuator.

15. The camper of claim 9, wherein the linkage mechanism comprises a mechanically actuated mechanism that includes a cable connecting the second door handle and the door fastener or the first door handle.

* * * * *